W. R. HULL.
MACHINE FOR ASSEMBLING BOLTS AND NUTS.
APPLICATION FILED MAY 22, 1918.

1,358,553.

Patented Nov. 9, 1920.
9 SHEETS—SHEET 3.

W. R. HULL.
MACHINE FOR ASSEMBLING BOLTS AND NUTS.
APPLICATION FILED MAY 22, 1918.

1,358,553.

Patented Nov. 9, 1920.
9 SHEETS—SHEET 4.

Witness
C. L. Kesler
Chas. S. Hyer

Inventor
Wallace R. Hull
By
Attorney

W. R. HULL.
MACHINE FOR ASSEMBLING BOLTS AND NUTS.
APPLICATION FILED MAY 22, 1918.

1,358,553.

Patented Nov. 9, 1920.
9 SHEETS—SHEET 6.

Inventor
Wallace R. Hull

Witness

By
Attorney

W. R. HULL.
MACHINE FOR ASSEMBLING BOLTS AND NUTS.
APPLICATION FILED MAY 22, 1918.

1,358,553.

Patented Nov. 9, 1920.
9 SHEETS—SHEET 8.

UNITED STATES PATENT OFFICE.

WALLACE R. HULL, OF PITTSBURGH, PENNSYLVANIA.

MACHINE FOR ASSEMBLING BOLTS AND NUTS.

1,358,553.  Specification of Letters Patent.  Patented Nov. 9, 1920.

Application filed May 22, 1918. Serial No. 236,012.

*To all whom it may concern:*

Be it known that I, WALLACE R. HULL, a citizen of the United States, residing at Pittsburgh, in the county of Allegheny and State of Pennsylvania, have invented new and useful Improvements in Machines for Assembling Bolts and Nuts, of which the following is a specification.

This invention relates to nut and bolt assembling machines and particularly embodies an improvement on the nut and bolt assembling machine disclosed by my Patent No. 1,274,562, dated August 6, 1918.

The object of the present invention is to provide mechanism for positively and effectively feeding bolts and nuts into engaging positions and automatically assembling the same, and ultimately discharging the bolt with the nut attached thereto ready for packing for the trade, certain features being added in the present construction and other parts eliminated relatively to the general construction and organization disclosed by my pending application above noted.

A still further object of the present invention is to more reliably and regularly move the bolts as fed into the operating mechanism from a hopper or supply source and to provide a clearance of the assembled bolts and nuts successively from the operating mechanism. As in my previous machine, a still further object of the present improvement or invention is to entirely dispense with hand labor in the assemblage of bolts and nuts and to render this operation entirely automatic, and in one form of the machine materially simplify the means for feeding the nuts from a source of supply to a carrier or transmitting element therefor.

Other objects and advantages will be hereinafter fully specified and the present invention consists in the construction and arrangement of the several parts which will be more fully described in the subjoined specification and pointed out in the appended claims.

In the drawing:

Fig. 9 is a top plan view, partially broken away, of the machine shown in Fig. 8.

In the present improved machine there are many structural features similar to those disclosed in the machine of my pending application and will be referred to herein in a general manner or only to such extent as to explain the features or improvements and differences in the present forms of machines involving the features and improvements. The two forms of machines which will be hereinafter described also have many features in common, or operate in a similar manner, to perform a specified function, but different in details of construction. As hereinbefore indicated, the preferred form of the machine is illustrated by Fig. 1 to 7 inclusive, together with the plow features as illustrated in detail by Fig. 16. Such parts as are common to both machines will be referred to by similar reference characters.

Figure 1:
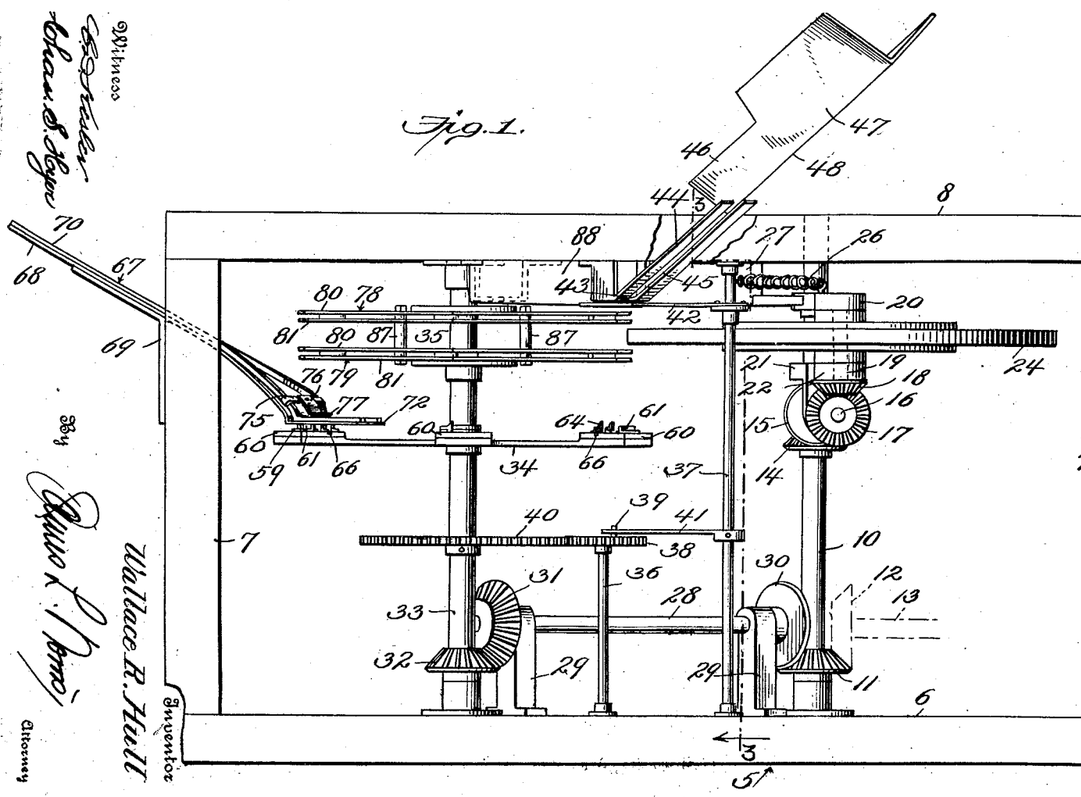
Figure 1 is a side elevation of a preferred form of the machine embodying features of the invention.
Figure 2:
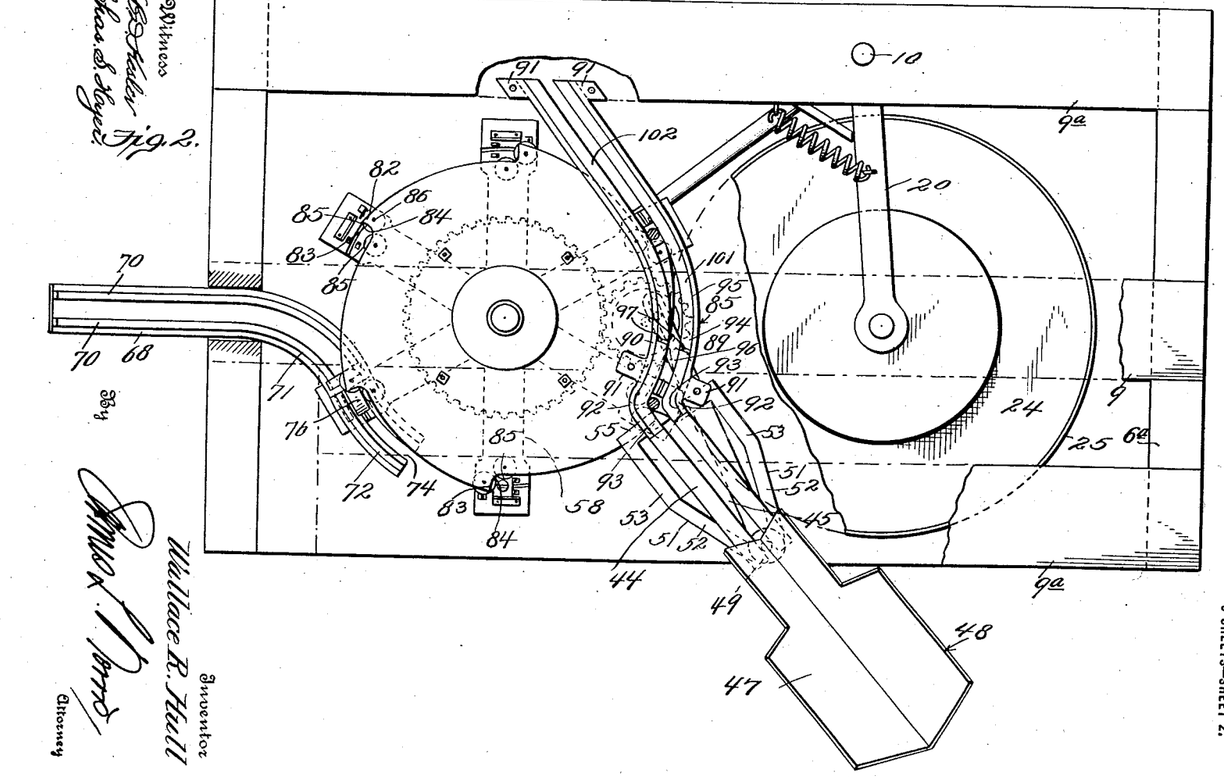
Fig. 2 is a top plan view of the improved machine partially broken away.

Referring first to Figs. 1 to 7 inclusive, and Figs. 16 and 17, the numeral 5 designates a suitable base consisting of a frame structure that may be of any form for supporting the various parts and embodying components in practical engagement by the various mechanical devices and coöperating elements comprised in the improved machine. As shown, this base consists of side frame bars 6 connected by end bars 6ª of metal or other material, the end bars having central end uprights 7 rising therefrom and connected to a top frame 8 provided with a longitudinal member 9 between the top side bars 9ª. The base, including the parts just explained, will be braced and supplied with any other structural features that may be found necessary for conveniently assembling the several parts or elements. In a suitable position in the base and between the upper and lower frames 5 and 8, a vertical drive shaft 10 is mounted and actuated from a suitable source of power. On this shaft 10 is a lower bevel gear 11 with which a corresponding gear 12 on a power transmitting shaft 13 has engagement, the gear 12 and shaft 13 being shown in dotted lines in Fig. 1, said shaft 13 running from a suitable source of power intended to be equipped with the usual form of clutches for throwing the same into and out of operative connection with relation to the source of power. On the shaft 10 a bevel gear 14 is also mounted at a suitable elevation above the gear 11, and meshing with said gear 14 is a bevel gear 15 on the end of a shaft 16 having a similar bevel gear 17 on the opposite end meshing with a gear 18 on the lower end of a stub shaft 19 held by a swinging arm mounted on the shaft 10 at its rear end as shown in the modified form of the machine illustrated in Fig. 9 and which includes the same operating mechanism. The swinging arm 20 is also shown by Fig. 2, but its connection to the shaft 10 is hidden under the rear top frame bar 9ª. The shaft 16 has bearing in suitable angular brackets 21 and 22, as indicated by dotted lines in Fig. 9, said brackets being similarly disposed and arranged as in the structure disclosed by my pending application, the bracket 21 engaging the shaft 10 and held by a collar 23 in proper position, and the bracket 22 engaging the shaft 19 over the gear 18, as shown by Fig. 1. On the shaft 19 and keyed to the latter to rotate therewith is a disk 24 having a peripheral binding or rim 25 of any suitable material, such as emery, wood, copper, or any other substance that will set up a rotative frictional adhesion relatively to the several bolts engaged thereby in a manner which will hereinafter be more fully explained. The bolt rotating disk 24 is movable with the arm 20, shaft 19 and gear 18, or, the said disk, arm, shaft and gear swing in an arc relatively to the shaft 10 as the center, and the gear 18, shaft 19 and disk 24 rotate as a unit in a proper direction to give the several bolts engaged by the periphery of the disk the rotation which will result in screwing the bolts into the nuts in engagement therewith. The arm 20, which serves as an arcuate swinging support for the shaft 19, disk 24 and gear 18, has one end of a spring 26 secured thereto, the opposite end of this spring being attached to an adjacent part of the frame, such as a depending hanger 27 attached to a portion of the top of the frame as shown by Fig. 1. This spring 26 serves to positively hold the periphery of the disk 24 in engagement with the several bolts as the latter are successively fed into position for contact by the said disk periphery.

Figure 3:
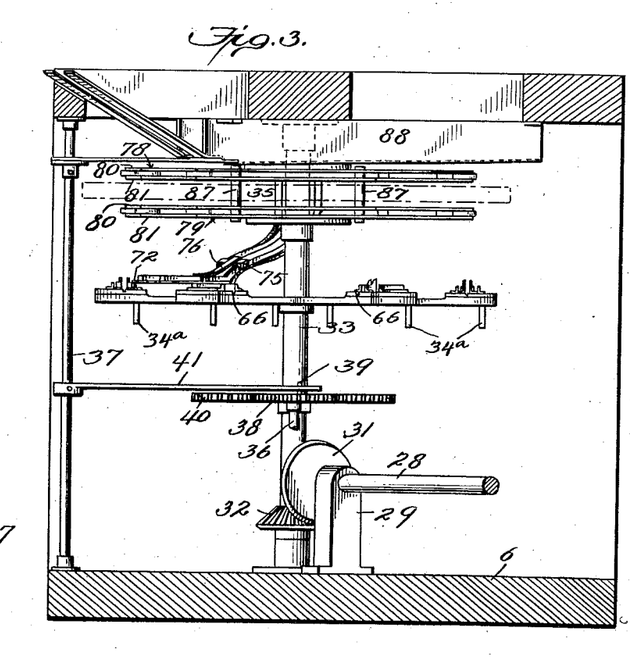
Fig. 3 is a transverse vertical section taken in the plane of the line 3—3, Fig. 1.
Figure 4:
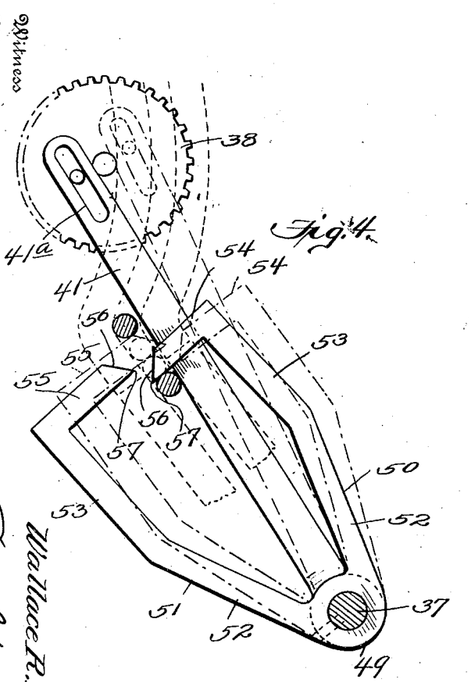
Fig. 4 is an enlarged diagrammatic view, partially in horizontal section and mainly in plan, illustrating the bolt mover and check associated with the outlet of the feed hopper or source of bolt supply and illustrated in different positions in full and dotted lines.
Figure 5:
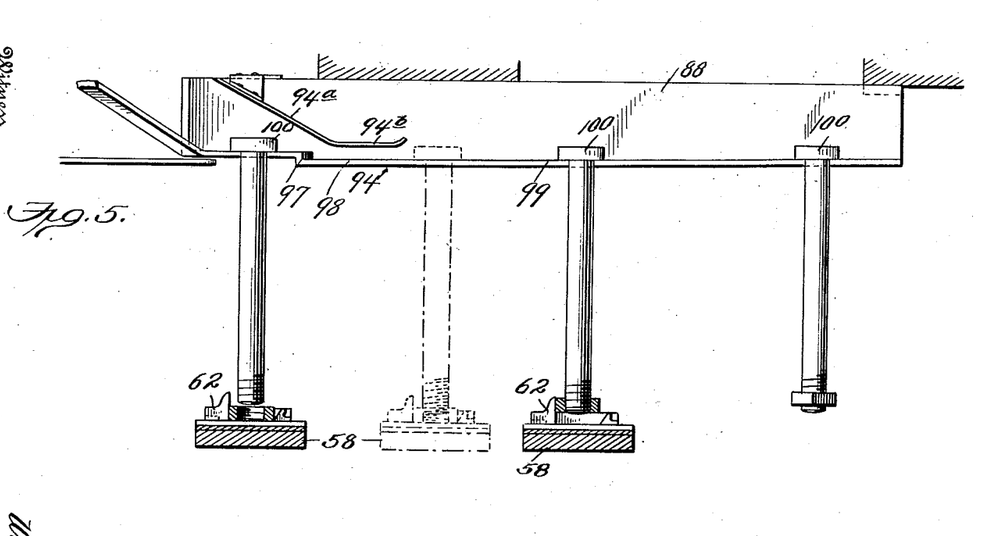
Fig. 5 is a sectional elevation showing in diagram in full and dotted lines the progress of a bolt and nut after assemblage and particularly the structure of the bolt rail or track.

A counter shaft 28 is mounted in suitable upright bearings 29 rising from a portion of the base frame 5, one end of this shaft having a bevel gear 30 thereon meshing with the bevel gear 11 on the shaft 10, a bevel gear 31 on the opposite end of the shaft 28 meshing with a bevel gear 32 on the lower portion of a vertical transmitting shaft 33 mounted in suitable bearings between the frames 5 and 8. Adjustably mounted on the shaft 33 is a nut-carrier or disk 34 and a rotatable bolt feeder or placer 35. The shafts 10 and 33 are continuously rotated when the machine is in operation, and in addition to these shafts, as shown by Figs. 1 and 3, are vertically disposed shafts 36 and 37 mounted in suitable bearings and involving part of the features of improvement, the shaft 36 being between the shafts 33 and 37 and terminating between the lower and upper frames 5 and 6, the shaft 37 extending the full vertical distance between the said frames. On the upper end of the shaft 36 is a horizontally arranged friction crank disk 38 having an upwardly projecting crank pin 39, the periphery of the disk 38 being continually engaged by the periphery of a friction driving disk 40 fixed in horizontal position on the shaft 33 and regularly rotated by the latter. The shaft 37 is actuated through the crank arm 41 secured thereto and extending over and movably connected to the pin 39 of the crank disk 38, and on the upper portion of said shaft 37 a bolt check or feed regulator 42 is secured and horizontally disposed close to the under side of the horizontal delivery extremity 43 of an inclined bolt slide or delivery plate 44 formed with a central slot 45. The upper end of the bolt slide or delivery plate 44 extends under the center of the lower reduced outlet extremity 46 of a hopper 47, disposed and suitably held fixed at the same angle of inclination as the slide or delivery plate 44 and preferably constructed of sheet metal centrally bent to provide a bottom angle 48, and two opposing sides at equal angles, the lower angles or angular bend 48 being placed over the upper end of the slide or delivery plate 44 with the angle or angular bend registering with the slot and extending into the latter. The bolt check or feed regulator 42 is constructed as clearly shown in detail by Fig. 4 and comprises a head collar 49 which is fitted over and secured to the shaft 37, and opposing arms 50 and 51 which first slightly diverge from the said head collar as at 52 and then continue in forward parallel relation as at 53 in the same horizontal plane, the arm 50 being slightly shorter than the arm 51, and both arms provided or formed with terminal inwardly projecting fingers 54 and 55, which are disposed at right angles to the parallel portions 53 of the arms and having terminal straight inclined cam faces 56, which provide pointed ends 57 at the maximum inwardly projecting terminals of the said fingers. The finger 54 of the arm 50 is shorter than the finger 55 of the arm 51 and during the operation of this check or feed regulator the fingers 54 and 55 are alternately oscillated inwardly and outwardly, or alternately dispose the closing means or the respective fingers close to the lower horizontal portion 43 of a bolt slide or delivery plate 44. The disks 38 and 40 have been hereinbefore described as friction disks, but it will be understood that they may be gear disks, and as shown by Fig. 4, the disk 38 is indicated as a gear disk, such construction being an obvious change and not in the least modifying the gear operation and function of the remaining mechanism. The crank arm 41 has its free extremity engaging the pin 39 of the disk 38 formed with an elongated slot 41$^a$ and by this means an oscillation is imparted to the shaft 37 and the bolt check or feed regulator 42 in proper timed relation to the operation of the remaining mechanism and particularly the nut carrier 34 and rotatable bolt feeder or placer 35.

The nut carrier 34, as clearly shown by Fig. 2, has a plurality of arms 58 radiating at proper intervals from the center body disk of said carrier, there being six arms shown in the present instance, the said arms serving as conveyers. Each conveying arm or element 58 is similar in construction to the remaining arms and a description of the devices on one of said arms or elements will suffice for all. Moreover, the same form of nut carrier is used in the type of machine illustrated by Figs. 8, 9, 10, 11, 12 and 13, with the exception of an added part, which will be more fully hereinafter described in connection with the modified form of the machine. For the sake of clearness of explanation and illustration, reference will be made also to Figs. 11 and 12 in considering the structure of the arms or elements 58 of the nut carrier which will be designated by the same reference characters.

Figure 6:
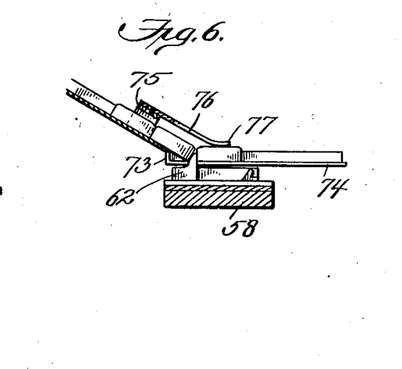
Fig. 6 is a detail sectional elevation showing portions of the nut feeder and carrier and the manner of automatically moving the nuts successively into conveying elements of the carrier.
Figure 7:
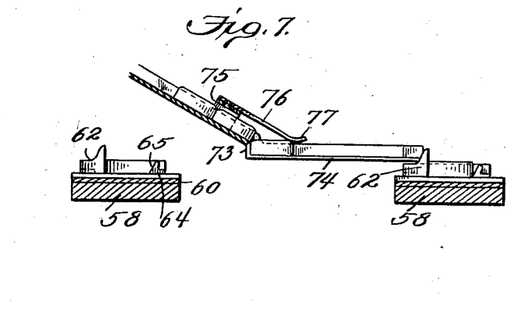
Fig. 7 is a detail sectional elevation similar to Fig. 6 showing two of the conveying elements of the nut carrier and the deposit of one of the nuts into one of the conveying elements and the automatic disposal of a nut into accurate position for engagement by a succeeding conveying element of the carrier.

As in the machine disclosed in my pending application aforesaid, the end of each arm or element 58 has a pair of opposite side angle members 59, which, in the present instance, are secured on a plate 60 suitably fastened on the upper surface of the terminal of each arm or element, the angle members having upstanding parallel flanges 61. Between the rear portions of the angle members 59 are parallel stop members 62 spaced apart a less distance than the distance between the flanges 61, and having vertically straight edges 63. In advance of the stops 62 and between the forward extremity of the angle members 59 and flanges 61 are opposing stops 64 which are also spaced apart and have rear inclined faces 65 which cause each nut deposited or placed on the end of the arm or element 58 to settle in horizontal or in firm flat resting position. The stops 62 also serve as drags or drawers for placing the successive nuts in the pockets formed by said stops, the side angle members 59 with their flanges 61 and the stops 64 in a manner which will be presently explained. An arcuate groove 66, struck from the center of the shaft 33, passes fully from the rear to the front edge of the plate 60 between the stops 62 and 64 for engagement therewith of a portion of a removable plow which will also be later explained. The nut pocket or seat on the end of each arm or element 58, as thus far explained, is the same in both forms of the machine and in the preferred form of the machine shown by Figs. 1 to 7 inclusive no other attachments or structural features are embodied in connection with the arms 58 and the nut seats thereon. Extending inwardly at a suitable downward angle through one end of the frame, as clearly shown by Figs. 1 and 2, is a nut supply means 67 in which a plurality of nuts are disposed either by hand or otherwise, and gravitate toward the lower inner extremity of said means, this means in the present instance specifically consisting of an inclined plate 68 held by an angle bracket 69 secured to the end of the machine frame and having thereon parallel rails 70 spaced apart such a distance as to permit the nuts to regularly slide therebetween over the plate 68. The plate 68 and rails or ribs 70 thereon within the end of the machine frame are grooved or given an arcuate formation, as at 71, and terminate in a horizontal discharge channel 72 which is grooved reversely to the portion 71 or in an arc with the same radius as the groove 66, of each nut pocket or seat of the nut carrier, or in other words, the discharge or delivery channel 72 is grooved in an arc struck from the center of the shaft 33. The discharge or delivery channel 72 is disposed at an elevation clear of the greater portion of the structural features of each nut pocket or seat and as shown by Figs. 1, 6 and 7, the outer end of the said discharge or delivery channel 72 abruptly intersects the plate 68 at a right angle and extending centrally through the channel, and continuing also through the lower angle wall 73 thereof, is a slot 74 of such width as to permit the drags or drawers 62 to pass therethrough, the remaining parts or devices of each nut pocket or seat clearing the under side of the channel, as clearly shown by Fig. 6. By this means the arms or elements 58 of the nut carrier are permitted to freely pass under the discharge or delivery channel 72 during the time that the drags or drawers 62 are performing their function or project through the slot 74 and engage and drag or draw a nut from the said channel to effect an automatic disposal of such nut in each pocket or seat therefor, provided on the carrier arms, as hereinbefore explained. A bridge bar 75 extends over the lower portion of the plate 68 a short distance in rear of the rear wall 73 of the channel 72 and secured to the said bridge bar is a downwardly and forwardly extending check spring 76 having a free upturned end 77. The free upturned end 77 of the check spring 76 is disposed far enough in advance of the rear wall 73 of the channel 72 to give space for the retention of a single nut in the channel close against the said rear wall 73 as shown by Fig. 7, the nuts gravitating successively into the channel and assuming the position shown by Fig. 7 after each nut is cleared or drawn over the channel from beneath and clear of the lower end of the said check spring by the drags or drawers 62 of the nut pockets or seats. As each arm or element 58 comes around and passes under the lower wall 73 of the discharge or delivery channel 72, the drags or drawers 62 engage the nut in horizontal position in the rear portion of said channel and gradually push the said nut over the channel toward the free end of the latter, the check spring 76 acting as a tension means to retain the nut in place during such operation so long as the spring engages the nut. As the nut clears the free end of the channel 72, it falls with its front edge against the inclined rear edges or faces 65 of the front stops 64 and then settles back into true horizontal position with its lower edge against the vertically straight edges 63 of the drags or drawers 62 which then serve as back stops, and by this means the nut is held against rotative movement during the time that the bolt is being assembled in relation thereto. The several arms or elements 58 regularly convey the nuts in position for assemblage with the bolts to a predetermined point and the pockets or nut seats always occupy the same position relatively to the rotatable parts of the rotatable bolt feeder or placer 35 above, both the nut feeder or carrier and the bolt feeder or placer being moved in timed relation.

The bolt feeder and placer 35 comprises upper and lower members 78 and 79, each member consisting of a pair of thin sheet metal plates 80 and 81 which are spaced apart and formed with outwardly projecting teeth 82, which have straight edges 83 slightly inclined into curved recesses or seats 84. Between the plates 78 and 79 are pairs of antifrictional rollers or disks 85 mounted on vertical shafts 86, the rollers or disks 85 being exposed adjacent to the seats 84. The shafts 86 have bearing in the plates 80 and 81 and the rollers or disks 85 are mounted thereon to loosely rotate so as to prevent binding of the bolts at the inner terminals of the teeth or in the seats 84. The rollers or disks 85 also facilitate the rotation of the bolts. The pairs of plates 78 and 79 are connected for unitary action or rotation by vertical bolts or connecting devices 87, which also hold said pairs of plates uniformly spaced. The teeth 82 of the upper and lower pairs of plates are in vertical alinement, so that each bolt is engaged at two points throughout its length and is thereby positively moved by the teeth without liability of displacement from vertical position.

The bolts are fed into the hopper 47 which is shaped as specified to cause the bolts to be directed first into the lower reduced extremity 46 and to turn and fall through the central slot 45 formed in the plate 44, the bolts dropping through the said slot 45 with the heads of the bolts resting on the top surface of the bolt slide or delivery plate 44. The bolts gravitate or move downwardly in close relation over the bolt slide or delivery plate 44 to the lower horizontal portion or table 43 of said slide or plate where they are engaged and individually fed forwardly by the oscillation of the fingers 54 and 55 of the arms 50 and 51 of the bolt check or feed regulator 42. The horizontal portion or table 43 of the bolt slide or delivery plate 44 continues into a bolt track 88 comprising opposite rails 89 and 90 of duplicate construction and held in fixed position at a suitable elevation by outer lugs or angle plate 91 as clearly shown by Fig. 2. A front inlet extremity of the track 88 is abruptly curved as at 92 and the side walls of the opposite rails 89 and 90 from said abruptly curved portion are straight as at 93 and disposed at a requisite angle relatively to the remaining portions of the rails to accurately register with the horizontal portion or table 43 of the bolt slide or delivery plate 44 and to also correspond to the general angle of the hopper 47 and the said bolt slide or delivery plate. Each rail 89 and 90 has a horizontal base flange 94 and a right angular outer side wall 95 thereby giving each rail an L-shaped contour in cross-section. The flanges 94 are of such width and the rails 89 and 90 are disposed in such relation that a slot 96 is formed between the inner edges of said flanges of equal width throughout the length of the track. The width of the slot 96 is slightly greater than the diameter of the bolt so as to permit the bolts to have an easy movement through the slot during the operation of assembling the bolts and nuts and in moving the assembled bolts and nuts toward the rear end or outlet of the track. Each flange 94, a short distance in rear of the abrupt curves 92 adjacent to the inlet of the track, has an angular drop, as at 97, and from this drop, as clearly shown in diagram by Fig. 5, the flange 94 is horizontally straight, as at 98, a sufficient distance to give ample time for the assemblage of each bolt and nut, the depth of the drop being approximately equal to the penetration of the lower screw-threaded extremity of each bolt into the nut associated therewith, and from the said horizontal flat portion 98 of each flange the latter inclines upwardly and rearwardly, as at 99, to cause the successive bolts with the nuts attached thereto to gradually rise and clear the pockets or seats at the ends of the arms or elements 58 of the nut carrier 34. As diagrammatically shown by Fig. 5, a bolt and nut are shown to the left in full lines in superposed relation, the bolt head 100 then resting upon the two flanges 94 at the inlet of the track and in advance of the drops 97, and by means, which will be presently set forth, the bolt and nut are moved so that the bolt head clears the angular drop 97 and at such time the bolt is rotated and screwed into the nut below and is brought into contact with the horizontal portions 98 where the assembling action takes place and the assembled bolt and nut with the nut still in its seat or pocket of the arm 58 carrying the same are moved together as shown in dotted lines, and as soon as the rise or the upward incline of the flanges 94 is reached, the assembled bolt and nut are gradually elevated until the nut is cleared from its seat or pocket, as shown in full lines in the third position to the right of Fig. 5, and at this time the arm 50 and its seat are about clear of the nut on the lower end of the bolt, the drags or drawers 62 only at this time engaging the nut. A sheet spring $94^a$ is secured to and extends downwardly into the track and has a horizontal extremity $94^b$ such distance above the track flanges 94 as to engage the bolt heads and force the bolts down while they are rotated. This automatic clearance of the assembled bolts and nuts is obviously provided to allow the arms or conveying elements 58 of the nut carrier 34 to regularly rotate without interference and when the lower nutted ends of the several bolts are released from the pockets or seats at the free ends of the arms or conveying elements 58, they are gradually shoved by contact over and between the flanges 94 toward the rear outlet of the track where they will be received in a suitable receptacle. The bolt feeder or placer 35 has its upper pair of plates 80 and 81 arranged to rotate closely under the inlet extremity of the track 88 and only to move under the said track a suitable distance in rear of the inlet, the bolts being successively engaged by the straight edges 83 of the outwardly projecting teeth 82 and whereby the bolts are gradually drawn into the curved recesses or seats 84 and in engagement with the pairs of anti-friction rollers 85, the projecting teeth and rollers of both the upper and lower pairs of plates simultaneously acting upon or engaging each bolt and insuring its steady movement progressively through the track and over the flanges 94 until final release of the individual bolts takes place by reason of the difference of contour of the track relatively to the rotating bolt feeder and placer 35. The periphery of the disk 24 engages each bolt while it is held by the upper and lower pairs of the teeth 82 just as the bolt passes over or clears the angular tracks 97 of the said flanges 94 as hereinbefore indicated and an instant rotation of the bolt is set up in view of the fact that the said disk 24 rotates in a direction reverse to the direction of the bolt feeder and placer 35, the several bolts being pressed firmly into the curved recesses or seats 84 in engagement against the antifrictional roller 85. After the bolts and nuts are assembled, the bolts continue to move with the nuts thereon through the track upwardly over the inclines 99 of the flanges 94 through the medium of the teeth 82, clearance of the said teeth relatively to the bolts being effected gradually when the bolts arrive at the lower terminal of the forward curved portion of the track as shown by Fig. 2, where they merge into the rear straight portion of the track, designated, respectively, by 101 and 102. The bolts are individually delivered into the inlet of the track and placed in position by timed operation, so that one bolt is engaged at all times by each set of upper and lower teeth 82 through the medium of the fingers 54 and cam faces 56 at the inner ends of the arms 50 and 51. In the position shown in Fig. 4, the finger 54 of the arm 50, as shown by full lines, is in position to check and hold the bolts in the slot 45 of the bolt slide or delivery plate 44, the finger 55 of the arm 51 just having operated, as illustrated by dotted lines, to force the bolt rearwardly into the track inlet. The points 57 of the fingers 54 and 55 separate the bolts by engaging between each two bolts and the inclined cam edges force the bolts rearwardly, this operation being effected alternately and as the finger 55 is moved inwardly, as shown by dotted lines, to force the bolt rearwardly into the track, the finger 54 has receded or moved back, as shown by dotted lines, to permit the bolts to gravitate through the slot 45 of the bolt slide or delivery plate 44, and as the finger 55 moves away or recedes, the finger 54 comes into play between the bolts and separates two of the bolts to place one bolt in position for subsequent engagement by the finger 55 and by this means the bolts are regularly and individually fed or pushed into the track in proper position for engagement by the teeth 82 of the bolt feeder or placer 35 in a manner hereinbefore explained.

Figure 8:
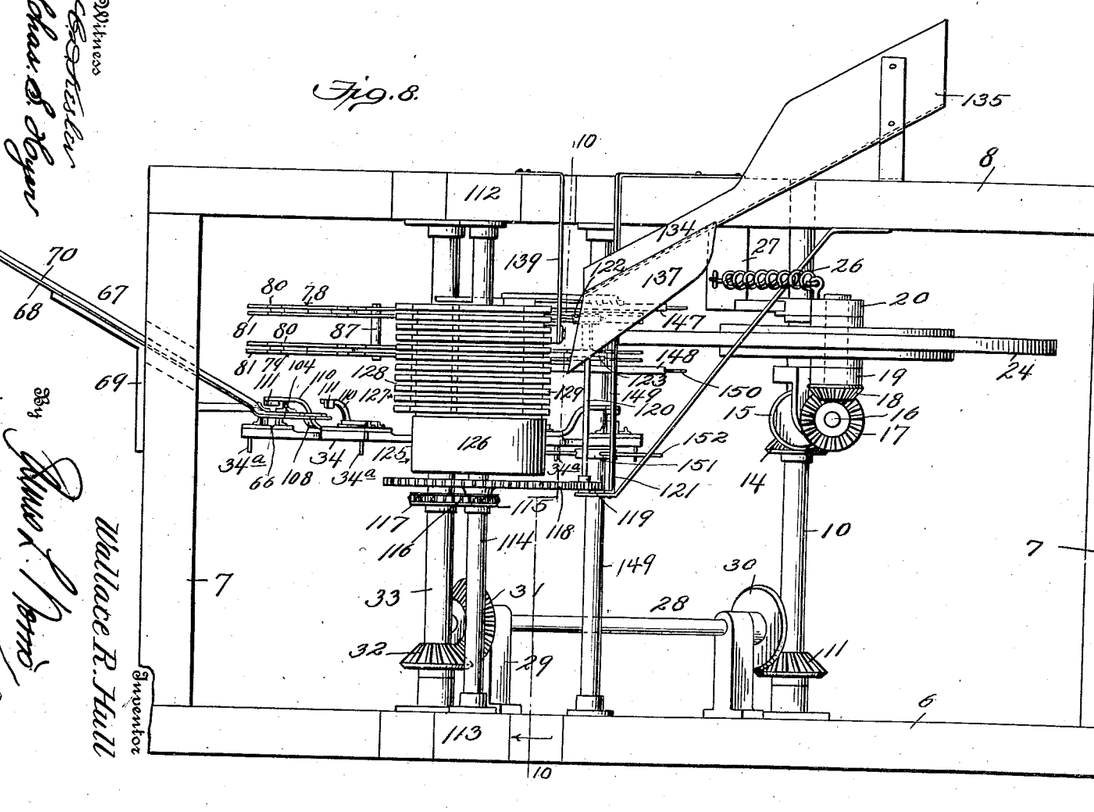
Fig. 8 is a side elevation of another or modified form of the machine.
Figure 10:
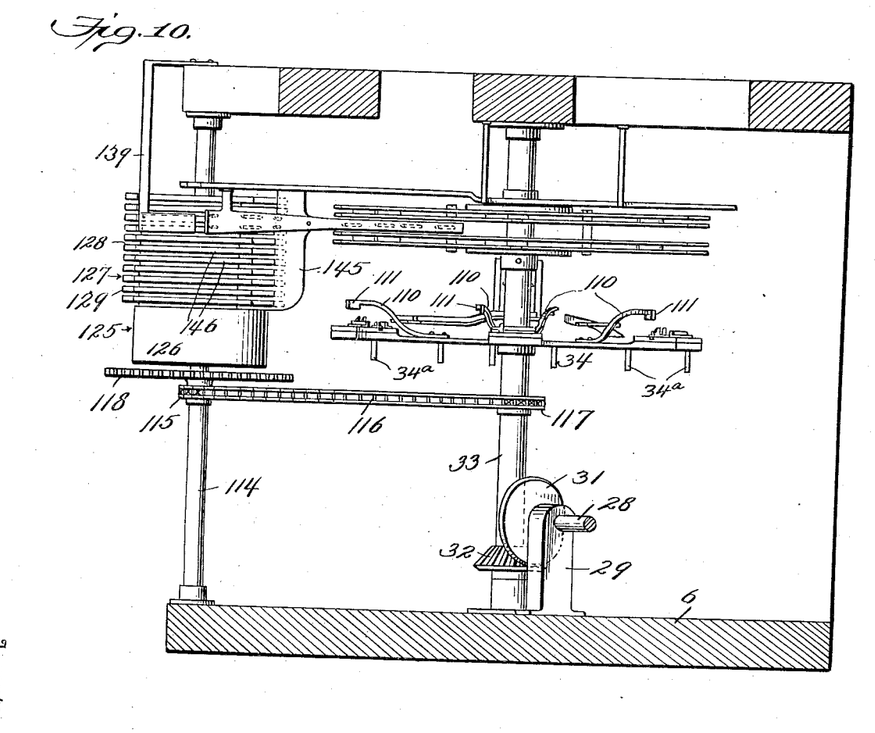
Fig. 10 is a transverse vertical section taken in the plane of the line 10—10, Fig. 8.
Figures 11, 12, 13:
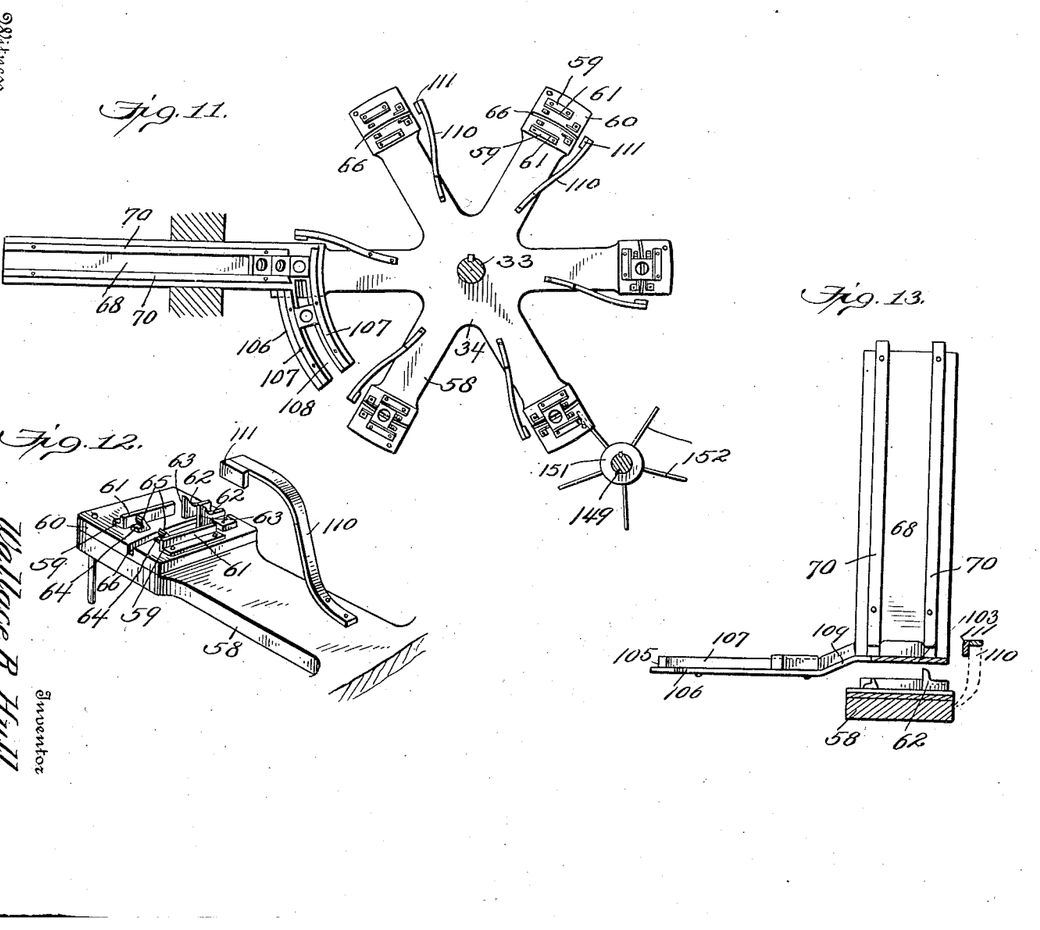
Fig. 11 is a plan view and partial horizontal section particularly showing the nut feeding means and a modified form and construction of the carrier and contributing elements as embodied in the machine shown in Fig. 8.
Fig. 12 is a detail perspective view of one of the nut conveying elements of the carrier as shown in Fig. 11.
Fig. 13 is a transverse vertical section through a portion of the nut feeder and one of the conveying elements of the carrier particularly showing the relative moving position of the said elements to the under portion of the carrier prior to removing a nut from the feeder outlet channel.

In the machine shown by Figs. 8 to 15, inclusive, the nut carrier 34 is essentially the same and embodies the arms or conveyers 58 with the nut seats in all particulars similar as hereinbefore explained and as shown by Fig. 12, and the main bolt feeder and placer 35, together with the disk 24 and the operating mechanism for these parts are also similar to the corresponding structures hereinbefore explained, and like reference characters are applied to the parts in both machines. In this modified form of the machine, there is an essentially different bolt placing or individual feeding means which is in part oscillatory, as in the preceding structure, the difference of the oscillation in this modified machine of a part of the bolt delivery or feeding means relative to the track residing in an automatic actuator or a check that is carried by the movable part and alternately comes into operative position relatively to the track to hold the bolts separate so that one bolt only may be fed forward to register with the nut held in the pocket or seat on one of the arms 58 below the end of the bolt. The nut feeding means or supply source 67 also embodies in the modified construction a downwardly and inwardly inclined plate or slide 68 which extends through one end of the frame and is held by the same form of brackets 69 as shown by Fig. 8, said plate being provided with the rails or ribs 70 spaced apart a sufficient distance to permit the nuts to slide downwardly therebetween. The lower extremity or discharge channel or delivery means for the nuts is slightly modified in this instance and comprises a lower horizontal support 103 at which the plate 68 terminates, the rails or ribs 70, as clearly shown by Fig. 13, also terminating at the said support. From the support 103 the discharge channel or delivery means 104 for the nuts in this modified form of the machine, extends at a curved angle or in an arc struck from the center of the shaft 33, said discharge channel or delivery means 104 projecting toward the front of the machine a sufficient distance to permit the positive removal of the successive nuts therefrom and disposal of the nuts in the seats or pockets at the ends of the arms or conveying elements 58. The discharge channel or delivery means 104 comprises opposite rails 105 embodying lower horizontal flanges 106 and vertical guard flanges 107, the inner edges of the flanges 106 being separated to from a clearance slot 108 for movement therethrough of the drags or drawers 62 of the several pockets carried by the arms 58. The rails 105 have a downwardly inclined drop 109 from the horizontal support 103 to lower the main body of the channel or delivery means 104 sufficient to permit the drags or drawers 62 to extend upwardly into the slot 108 a sufficient distance to cause a positive engagement of the front straight edges 63 of the drags with each nut. The support 103 is at such an elevation above the plane of the highest portions or ends of the drags 62 that each arm or conveying element 58 with its seat or pocket components may readily swing or pass under the said support and the discharge channel or delivery means 104 is in such fixed position that there will always be an accurate registration and operation of the drags 62 therewith, the downwardly inclined or drop portions at the rear of the rails also being open or having the slot 108 cut thereinto up to the support 103. The drags 62 act on or engage the individual nuts disposed or placed in the discharge channel or delivery means 104 and it is necessary to provide means to move each nut into place in the said discharge channel or delivery means, and for this purpose each arm or conveying element 58 is provided with a push arm 110 secured thereto and curved above to give it the proper elevation, the said push arm being provided on its front edge at the free end with a push head 111 having dimensions approximating the side edge of a nut, said push head 111 standing high enough to clear the upper surface of the support 103 and engage the nut resting thereon to push said nut head downwardly over the rear rail drop, as at 109, into place in the rear portion of the discharge channel or delivery means 104, as shown by Fig. 13. The push head 111 will become disengaged gradually from each nut as the latter is moved downwardly over the rear angular drop of the rails and through the medium of the said push arm and its head as explained, each arm or conveying element 58 as it removes a nut from the discharge channel or delivery means, places another nut into position for removal by the next arm or conveying means 58. Each arm or conveying means 58 is provided with one of the push arms 110 of the general contour and elevation shown by Fig. 12. The nut carrier 34 in this instance has pins 34ª depending from the arms or conveying elements 58 for a purpose which will be presently explained.

Figures 14, 15, 16, 17:
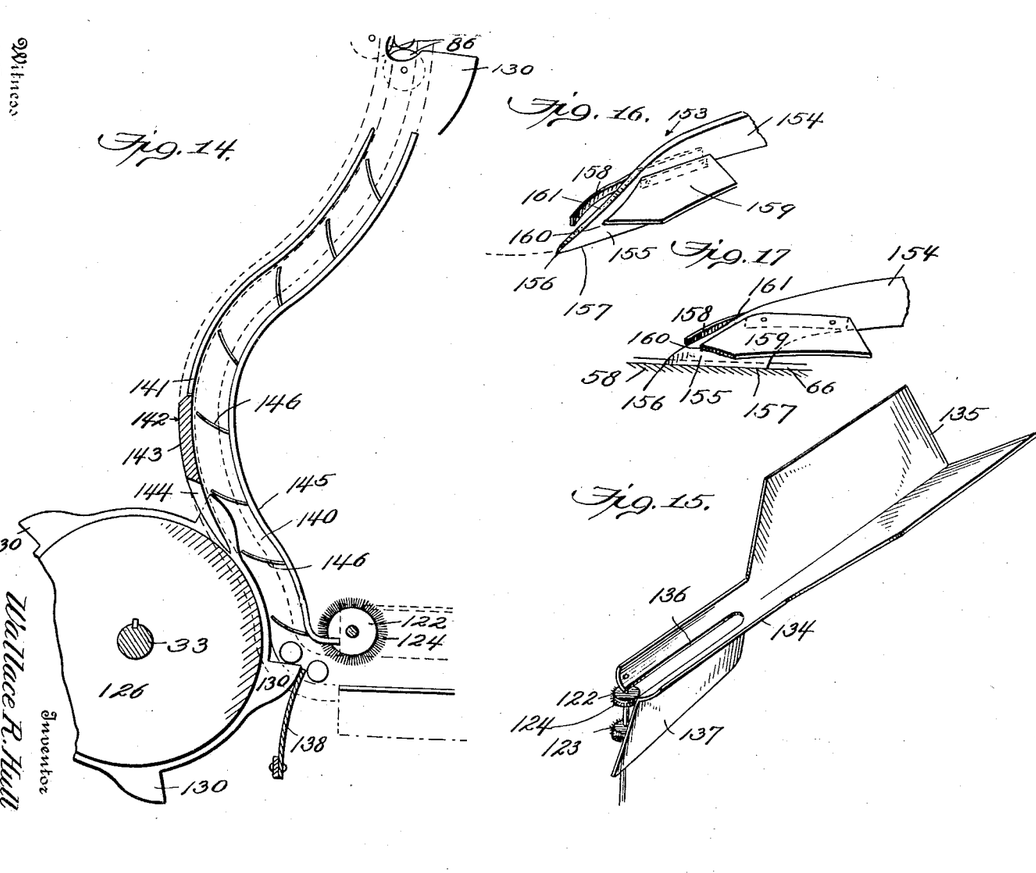
Fig. 14 is a diagrammatic view in horizontal section and plan showing the manner of feeding the bolts from the hopper outlet into position between the rails and tracks therefor for successive assemblage with the nuts and also illustrating the contour of the track rails and embodied in the form of the machine shown by Fig. 8.
Fig. 15 is a detail perspective view of the bolt feed hopper and brush wheels embodied in the machine shown by Fig. 8.
Fig. 16 is a detail view of the plow for removing the nuts from the conveying elements of the carrier when said nuts skip the bolts, said plow being common to both forms of the machine.
Fig. 17 is a detail side elevation of the plow.

At the front of the machine and held between the upper and lower brackets 112 and 113 is a vertical shaft 114 having a sprocket wheel 115 thereon over which is trained a chain belt 116 and also over a sprocket 117 fixed on the shaft 33 for operating the nut carrier 34 and bolt feeder or placer 35. Above the sprocket wheel 115 the shaft 114 also has a gear wheel 118 fixed thereon and held in continual mesh with the pinion 119 on the lower end of a vertical brush shaft 120 supported at its lower end in a suitable bearing held at the lower extremity of a bracket 121, whose members extend upwardly and are secured to the top frame of the machine, as clearly shown by Fig. 8. On the upper portion of the shaft 120 are upper and lower brush wheels 122, and 123, each having wire bristles 124 and operated in proper timed relation through the gearing specified. Above the gear 118 the shaft 114 also has fixed thereon a drum 125 having a lower reduced smooth portion 126 and an upper enlarged portion 127 circumferentially grooved, as at 128, to form integral disk-like members 129 which are provided with a series of teeth 130, as clearly shown in Fig. 9, the teeth 130 of all the disks 129 being in vertical alinement and adapted to engage different portions of a bolt throughout the length of the latter and successively push the bolts around the track into such positions that they may be engaged by other mechanism. The drum 126 coöperates with an elongated inlet 131 of a track 132, the front terminal mouth of the inlet 131 being turned at an angle, as at 133, and connected thereto is the lower reduced extremity 134 of a hopper 135 which is arranged at an angle of inclination, as shown by Fig. 8, in advance of the front of the machine and is held fixed similar to the hopper as hereinbefore explained. This hopper 135 is shown in detail by Fig. 15 and the main body of the same is similar to the hopper 47 hereinbefore described, but the lower reduced extremity is curved and centrally slotted, as at 136. The brush wheels 122 and 123 are disposed close to the terminal of the reduced extremity 134 of the hopper 135, the upper end of the shaft 120 having bearing in one of the members of the said reduced extremity 134. The opposite end of this reduced extremity 134 is provided with a depending flange 137 which is greatly increased in width at its inner lower end to serve as a shield or guard against which the bolts are pressed, particularly when engaged by the brush wheels 122 and 123. The object of these brush wheels 122 and 123 is to push the bolts in against the drum 126 and particularly into engagement with the hooks or projections 130, so as to insure a positive movement of the bolts into and through a portion of the length of the inlet 131 of the track 132 with which the said hooks or projections 130 coöperate, as clearly shown in Figs. 9 and 14. The feed regulator in this instance consists of an inwardly projecting horizontally disposed spring arm 138 carried at the lower end of a hanger 139 secured to the upper portion of the frame of the machine, as shown in Fig. 8, said arm 138 being oscillated by contact with the hooks or projections 130 of the drum 126, as shown by Fig. 14, to check the movement of the bolts from the lower reduced extremity 134 of the hopper 135 and permit only one bolt at a time to come into position for engagement by the said hooks or projections 130. As each hook or projection 130 becomes disengaged from the spring arm 138 by passing the same, this arm resumes its normal position and one of the bolts is permitted to pass the inner free end thereof and the next hook or projection 130 engaging the spring arm 138 causes it to assume the position shown in Fig. 14, and thereby check the movement of all the bolts on the right side thereof and against the action of the feeding brush wheels 122 and 123. The inlet 131 of the track 132 is provided with opposite rails 140 and 141 which are so curved or shaped as to facilitate the movement of the bolts into and through the inlet 131 and secured to the inner rail 141 under the track is a guard 142 having a vertically extended head 143 at its outer end provided with a plurality of tapered fingers 144 which are so disposed and shaped as to enter the grooves 128 of the upper enlarged portion 127 of the drum or cylinder 126 to hold and guide each bolt in its correct course in the track inlet. An opposing guard 145 is secured under the track rail 140 and has a plurality of spring fingers 146 arranged at intervals throughout the length thereof and projecting into the inlet of the track and almost entirely across the same, the said fingers being shaped to compensate for the variation in curvature of this track inlet and operating to check and hold all the bolts upright and also to keep them in their proper course in the track inlet. Adjacent to its outer or front end, this guard 145 has the springs in double form therein or arranged in pairs, as shown by Fig. 10, said double springs being disposed adjacent to the path of operation of the hooks or projections 130 with the track inlet. The bolts, after disengagement from the hooks or projections 130 of the drum or cylinder 126, are shifted by actuators 147 and 148 mounted on a shaft 149 and provided with a plurality of radially projecting pins or projections 150 to engage upper and lower portions of the bolts and shift them through the inlet 131 of the track 132 to a point where the individual bolts will be engaged by the hooks or projections 82 of the main bolt feeder or placer 35, the remaining structural features of the track 132 being similar to those heretofore described and the operation of assembling the bolts and nuts through the medium of the disk 24 is precisely the same as in the first form of the machine and as also disclosed in my pending application, heretofore noted. The shaft 149 is mounted in suitable bearings and on its lower extremity is provided with a rotary means consisting of a disk 121 provided with a plurality of outwardly projecting radially disposed arms 152 which are located to project under the nut carrier 34 and are engaged by the depending pins 34ª of said carrier to rotate the shaft 149 and the actuators 147 and 148 in timed relation to the said carrier or to move the bolt with such preciseness and accuracy as to cause the lower screw-threaded end thereof to register with the nut carried by the seat of one of the arms 58. This mechanism is similar to that disclosed by my pending application hereinbefore specified. The track 132 in the modified form of the machine is also curved similar to the track in the machine of my pending application, but it will be understood that the contour as well as the length of the tracks as herein shown may be varied at their rear or outlet portions or extremities.

A nut removing plow 153 is used with each machine, as shown in detail by Fig. 16. The purpose of this plow is to clear each pocket of any nut that may be carried around therewith or fail to be applied to a bolt end during the actuation of the machine, said plow being located in rear of the discharge channel or outlet means 104 for the nuts a sufficient distance to completely liberate or disengage a nut that may be carried by either of the arms 58 or which has skipped a bolt. This plow, as more clearly shown by Fig. 16, consists of an arm 154 suitably shaped and secured to a part of the frame of the machine and terminating in a tapered blade 155 at its free end, said blade having a point 156. The lower edge 157 of this plow is horizontally straight and the arm 154 and blade 155 are longitudinally curved to correspond to the arc of the groove or channel 66 of each nut seat, the lower straight edge 157 of the blade 155 engaging the groove 66 of each arm 58 as the latter swings around beneath the said plow attachment and its blade. On the outer side of the arm 154 and projecting partially over the length of and at a distance from and slightly above the upper edge of the blade 155 is a yielding arm 158 and on the inner side of the blade is a horizontal guard flange 159 with a forward pointed extremity 160. The upper edge 161 of the arm and blade gradually inclines downwardly to the point 156 so that when the plow blade 155 enters the groove 66 of one of the arms and engages a nut that may be carried in the pocket over a part of the groove, said nut is raised by the said inclined edge 161 and lifted out of the pocket, and if it should happen to fall over one side, it would be engaged by the arm 158 which is curved to give the released nut a pushing action, or if it falls over the opposite side, it will be taken up by the flange 159, said flange and the arm 158 being high enough to clear the projecting components of each nut seat. By this means the removal of a nut carried around by one of the arms is assured and every pocket will thus be free for successive charging by one of the nuts from either of the discharge channels or outlets of the nut supplying means.

In the preparation of the machine for operation, the bolts are placed in either the hopper 47 or 135 and the nuts in the supply means therefor, and are caused to gravitate for engagement with the devices that operate to place them in proper position by the mechanism hereinbefore explained, so that they may be disposed in registering relation for assemblage, the general operation being the same in both forms of the machine hereinbefore described. The nut carrier 34 and main bolt feeder and placer 35 may be readily adjusted on their shaft 33 to accommodate bolts of different lengths and the other mechanisms may be adjusted or shifted to compensate for a difference in length of the bolts fed to the machine in either of the forms of the latter. The movements of the bolts are eased during the entire course of travel from the hopper supplying the same to the track and through the latter to the outlet where they fall into a suitable receptacle or may be taken off manually as desired.

In the foregoing preferred and modified forms of the machine it will be understood that many of the features are common and perform essentially the same function, despite the fact that a different structure may be utilized for the specific operations and functions.

What is claimed is:—

1. In a machine for assembling bolts and nuts, a rotatable nut carrier disposed horizontally and having series of spaced nut carrying devices, means for feeding nuts to the carrying devices, a main bolt feeder and spacer having means for engaging the bolts, a track through which the bolts are movable provided with a horizontal portion terminating in a drop at a distance from the inlet end of the same for effecting a gravitating disposition of the bolts relatively to the track and the nuts thereunder, and rotatable means frictionally engaging the bolt shanks for turning the bolts to screw them into the nuts.

2. In a machine for assembling bolts and nuts, a nut carrier, a track for the reception of the bolts and movement thereof successively into engagement individually with relation to the nuts, means for separating the bolts and causing them to be individually fed relatively to each nut, the track having a horizontal portion terminating in a drop for causing the bolts to gravitate toward the nuts and also provided with a gradual rise rearwardly from the said drop for subsequently elevating the combined bolts and nuts, and means for turning the bolts to screw them into the nuts.

3. In a machine for assembling bolts and nuts, a track, rotatable devices individually acting upon the bolts and nuts in succession to dispose the individual bolts and nuts in engaging position one over the other and embodying means for feeding the bolts into the track, the track having means throughout the length thereof for maintaining the bolts in positive separated relation and holding them spaced regular distances for registration with succeeding single nuts prior to engagement with the latter, and means for rotating the bolts to screw them into the nuts.

4. In a machine for assembling bolts and nuts, means for feeding the bolts and nuts and moving them into individual engagement, a track in which the bolts are fed provided with means in the length thereof for effecting a gravitating feed of the bolts and also with means for separating the bolts for individual engagement with successive nuts, and means for rotating the bolts and causing them to screw into the nuts.

5. In a machine for assembling bolts and nuts, a track, a rotatable nut carrier, means for feeding nuts to the carrier, a rotatable main bolt feeder and placer having means for engaging the bolts and moving them into and along the track, the track being provided with means for effecting the gravitating feed of the bolts into position for engagement by the said main bolt feeder and placer, means for individually separating the bolts prior to their disposition in the track for engagement by the main bolt feeder and placer to effect an individual registration with successive nuts, and means for rotating the bolts to screw them into the nuts.

6. In a machine for assembling bolts and nuts, a track, means for feeding the bolts and nuts and moving them into individual engagement and embodying oscillating means comprising opposing arms of different lengths terminating at their forward ends in inward projections provided with cam faces and operative for individually separating the bolts and checking the feed of more than one bolt at a time and also for moving individual bolts into the track, and means for rotating the bolts to cause them to screw into the nuts.

7. In a machine for assembling bolts, a track, means for feeding the bolts and nuts and moving them into individual engagement and embodying oscillating means for preliminarily moving the bolts into the track, the oscillating means comprising opposed members varying in length with forward inwardly projecting angular terminals, the one terminal being in advance of the other for individually separating and checking the bolts to insure a single bolt feed, and means for rotating the bolts in the track and causing them to screw in the nuts.

8. In a machine for assembling bolts and nuts, a track, means for feeding individual nuts over the track, means for feeding bolts in upright position to the track and embodying an oscillating regulator and check located adjacent to the inlet of the track and comprising a pair of arms of different lengths, the arms having forward inwardly projecting angular terminals with the one arm terminating in advance of the other and both arms formed with in lined cam faces to provide separating wedge devices at the maximum inwardly projecting terminals of the said arms, means for individually effecting registration of the successive bolts in the track with individual nuts, and means for rotating the bolts and causing them to screw into the nuts.

9. In a machine for assembling bolts and nuts, means for feeding the bolts and nuts and moving them into individual engagement, a track into which the bolts are fed and held in upright position, the track having a horizontal portion leading to a drop for effecting an automatic depression of the bolts and a registration of each bolt with its corresponding nut, and means for rotating the individual bolts and causing them to screw into their respective nuts.

10. In a machine for assembling bolts and nuts, a track having a drop and bottom inclined upwardly toward the rear thereof, means for feeding nuts under the track, means for individually disposing bolts within the track and holding and moving them in upright position, the track drop effecting individual registration of the bolts and nuts, and means for rotating the bolts and causing them to screw into the nuts.

11. In a machine for assembling bolts and nuts, a nut carrier having pockets to receive the nuts, each pocket being provided with front and rear stop means, means for individually feeding the nuts to the several pockets, bolt feeding and holding means for effecting an individual registration of the bolts and nuts, and means for rotating the bolts to cause them to screw into the nuts.

12. In a machine for assembling bolts and nuts, a nut carrier having pockets to receive the nuts, each pocket being provided with rear stops which also serve as nut drags, the front portions of the pockets being provided with stops with rearwardly and downwardly inclined edges for causing the nuts to settle horizontally into the pockets, means for individually feeding the nuts to the pockets, bolt feeding, placing and holding means operating to individually register each bolt with a nut, and means for rotating the bolts to cause them to screw into the nuts.

13. In a machine for assembling bolts and nuts, a nut carrier having pockets to receive the nuts, means for effecting a gravitating feed of the nuts provided with a discharge channel from which the nuts are delivered into the pockets, a track, means for feeding bolts to the inlet of the track, an oscillating check and regulator adjacent to the inlet of the track comprising opposing members with forward inwardly projecting extremities, the one extremity of the latter member being in advance of the other, for individually separating the bolts and holding the remaining bolts against movement relative to the track, a main bolt feeder and placer having teeth to engage and move the bolts in the track in registration with the nuts, and means for rotating the bolts to cause them to screw into the nuts.

14. In a machine for assembling bolts and nuts, a nut carrier, a track having drop and inclined portions for effecting registration of the bolts and nuts and disengagement of the nuts attached to the bolts from the carrier, mechanism for controlling the feed of the bolts to the track, means for feeding nuts adjacent to the track for individual assemblage with the bolts, and means for causing the bolts to screw into the nuts.

15. In a machine for assembling bolts and nuts, a track for receiving the bolts, means for feeding bolts toward the inlet of the track, an oscillating check and feed regulator adjacent to the feed inlet of the track comprising inwardly projecting means having advanced portions differing in length for individually moving the bolts into the track and holding the remaining bolts against feeding movement, means for feeding nuts adjacent to the track for individual assemblage with the bolts, means for moving the bolts along the track in registration with the nuts, and means for causing the bolts to screw into the nuts.

16. In a machine for assembling bolts and nuts, a track for receiving the bolts, means for feeding bolts toward the inlet of the track, an oscillating check and feed regulator disposed adjacent to the inlet of the track and having arms with inwardly projecting terminal fingers provided with pointed ends and inclined faces to engage the bolts, the one inwardly projecting terminal finger being in advance of the other a distance to permit only one bolt to be located between the two fingers, means for feeding nuts adjacent to the track for individual assemblage with the bolts, means for moving the bolts along the track, and means for causing the bolts to screw into the nuts.

17. In a machine for assembling bolts and nuts, a track for receiving the bolts and having means in the length thereof for effecting a drop of the bolts and a gradual elevation of the assembled bolts and nuts, means for feeding the bolts toward the inlet of the track, oscillating means at the inlet of the track for feeding the bolts one at a time into the track and check the movement of the remaining bolts, the said means for feeding bolts toward the inlet of the track having front members spaced apart a distance to allow only one bolt to be located therebetween, means for feeding nuts adjacent to the track for individual assemblage with the bolts, means for moving the bolts along the track, and means for causing the bolts to screw into the nuts.

18. In a machine for assembling bolts and nuts, a track for receiving the bolts, a downwardly and rearwardly inclined angular hopper having a reduced lower extremity, a slotted plate extending from the reduced extremity of the hopper down to the inlet of the track, oscillating means disposed at the lower terminal of the said slotted plate adjacent to the inlet of the track to separate the bolts and feed them one at a time into the track and holding the remaining bolts against movement, means for feeding nuts adjacent to the track for individual assemblage with the bolts, the track being provided with a horizontal portion leading to a drop therein for causing the bolts to individually gravitate and register with the individual nuts, means for moving the bolts individually along the track, and means for causing the bolts to screw into the nuts.

19. In a machine for assembling bolts and nuts, a track for receiving the bolts, means for feeding bolts toward the inlet of the track and for moving the bolts individually into the latter, means for feeding nuts adjacent to the track for individual assemblage with the bolts, means for individually supplying the nuts to the said nut feeding means and embodying an element for holding the nuts in check to insure a disposition of a single nut in place for discharge to the said nut feeding means, means for moving the bolts along the track, and means for causing the bolts to screw into the nuts.

20. In a machine for assembling bolts and nuts, a track for receiving the bolts, means for feeding bolts toward and moving them into the inlet of the track, a carrier for feeding nuts adjacent to the track for individual assemblage with the bolts, means for supplying nuts to the carrier consisting of a downwardly inclined slide terminating in a lower discharge channel having a spring check to hold the nuts against movement until disengaged for discharge, means associated with the carrier for individually moving the nuts from the said discharge channel, means for moving the bolts along the track, and means for causing the bolts to screw into the nuts.

21. In a machine for assembling bolts and nuts, a bolt receiving track having horizontal portion leading to a drop and a gradual inclined rise from the drop to the rear of the track, and means for feeding bolts to the track and nuts under the track and for causing the bolts and nuts to be assembled.

22. In a machine for assembling bolts and nuts, a nut carrier having nut pockets with a groove centrally passing through the pockets, and a plow having a reduced end for engaging the groove of each pocket and having means thereon above the lower edge for lifting and discharging the nuts from the pockets when the nuts pass and fail to become assembled with the bolt ends and including a flange standing at an angle to one side of the plow.

23. In a machine for assembling bolts and nuts, means for holding the bolts in position for receiving nuts, a nut carrier provided with a plurality of pockets having a groove located between parts of the pockets, the nut carrier disposing the nuts in registering relation to the bolts, and a plow having an extremity with a lower straight edge to engage the groove and an inclined upper edge and laterally projecting means operative to throw the nuts out of the pockets and off the said plow when nuts pass and fail to become assembled with the bolt ends, the plow including means at opposite sides for assisting in the discharge of the nuts.

24. In a machine for assembling bolts and nuts, a track for receiving the bolts, means for feeding the bolts to the track, a nut carrier having a series of pockets to receive nuts and operating to place the latter in registering position relatively to the bolt ends, each of the pockets having a groove between parts thereof, and a plow having a lower horizontally straight edge to engage the groove and an upper inclined edge to unseat a nut from its pocket, the one side of the plow having a yielding arm and the opposite side provided with a horizontal guard flange.

25. In a machine for assembling bolts and nuts, a track, means for feeding bolts into the track, means for disposing the nuts in engaging position relatively to the bolted ends, the bolt feeding means comprising a grooved drum with a series of outwardly projecting teeth between the grooves thereof, and a guard having spring fingers to engage the grooves of said drum.

26. In a machine for assembling bolts and nuts, a track for receiving the bolts, a feed hopper for supplying the bolts to the track, an oscillating check device between the hopper and the inlet of the track and having arms of different lengths with inturned angular extremities provided with inclined bolt engaging edges, the one in-turned angular extremity being in advance of the other, means for operating the said check, and means for feeding nuts into registering positions relatively to the bolts.

In testimony whereof I have hereunto set my hand in presence of two subscribing witnesses.

WALLACE R. HULL.

Witnesses:
 JAS. A. GRIFFITH,
 E. D. BORANO.